Dec. 12, 1933.   O. A. HOUGEN ET AL   1,938,832
APPARATUS FOR REDUCING METALLIC ORES
Filed Jan. 21, 1931
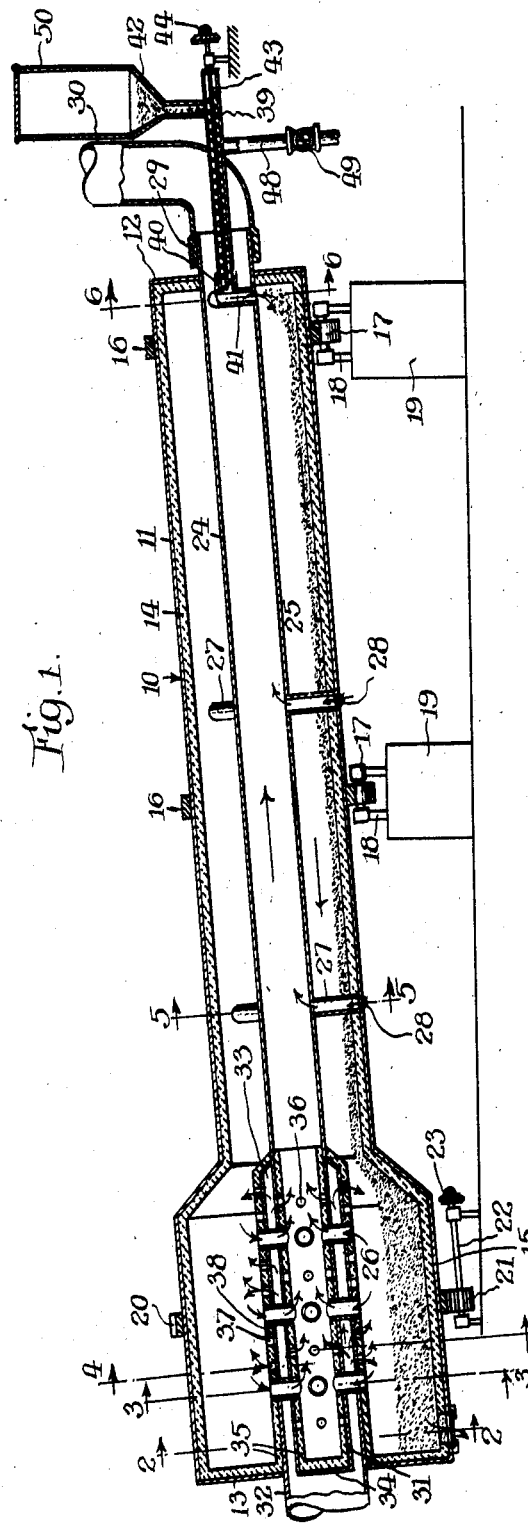
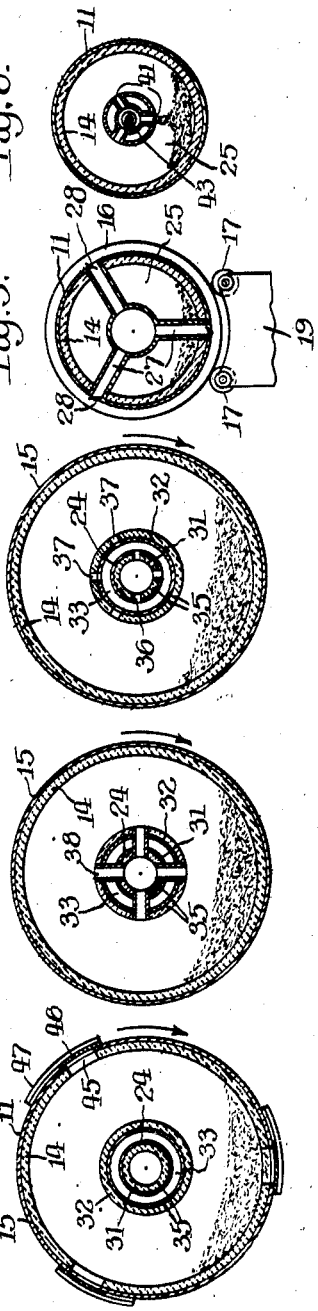
Inventors:
Olaf A. Hougen,
Kenneth M. Watson,
By Chindall, Parker & Carlson
Attys.

Patented Dec. 12, 1933

1,938,832

UNITED STATES PATENT OFFICE 1,938,832

APPARATUS FOR REDUCING METALLIC ORES

Olaf A. Hougen and Kenneth M. Watson, Madison, Wis.

Application January 21, 1931. Serial No. 510,153

10 Claims. (Cl. 266—24)

The present invention relates to the treatment of metallic ores, such for example as iron ores, and more particularly to a novel apparatus for reducing or deoxidizing such ores to a metallic state.

Heretofore, the reduction of iron ores for the production of sponge iron, pig iron and steel has been accomplished in a rotary kiln slightly inclined from the horizontal. The process involves mixing the ore in the desired proportion with a suitable reducing agent, such as a finely divided carbonaceous material, and supplying the mixture to the upper end of the kiln. Rotation of the kiln causes the mixture to travel downwardly toward the lower end where the finished product is discharged. Heat is supplied to the mixture in the kiln either indirectly or from the direct combustion of gases in contact with the surface of the mixture.

Thus, a downwardly increasing temperature gradient is maintained along the kiln in the upper zone of which the mixture is preheated, and in the lower zone of which the ore and the reducing agent react together to deoxidize the ore.

Various objects of the present invention reside in the provision of a new and improved apparatus of the rotary kiln type comprising one or more of the following features:

(1) An axial heating flue which extends through the kiln and defines a closed annular heating chamber therewith, with the upper end portion constituting a preheating zone and the lower end portion constituting a reduction zone, and which opens at its lower end to the reduction zone.

(2) An external lining of radiant refractory material about the lower end of the heating fluid within the reduction zone.

(3) Means for providing air for combustion in controlled quantities to the reduction zone at desired points adjacent the exterior of the lower end of the heating flue.

(4) Means for providing air for combustion in controlled quantities at desired points to the lower end of the central heating flue.

(5) Means for providing secondary air for combustion in controlled quantities at desired points to the central heating flue within the preheating zone to effect complete combustion and cooling of the flue and its supports.

Other objects of the invention reside in the provision of means suitable to a process of reduction of metallic ores comprising one or more of the following features:

(1) Preheating a mixture of ore and a reducing agent, such as coal having a high volatile content, in the absence of air, by radiant heat in the course of its movement along the interior of a rotary kiln, and causing the mixture and products of distillation and reduction to travel in the same direction toward the reduction end of the kiln.

(2) Heating the mixture in the reduction zone by radiation from the hot refractories of an adjacent flue, and by the partial combustion, supported by air supplied adjacent the exterior of the flue, of the gases of distillation and reduction in contact with and protecting the charge against oxidation.

(3) Withdrawing the products of combustion and unburned gases of distillation and reduction out of contact with the charge into the flue, and therein effecting complete combustion of the gases, through the supply of additional air to the flue, to heat the radiant surfaces of the flue which serve to preheat the incoming charge and to heat the material in the reduction zone, the flow through the flue being counter to that of the material being treated.

Further objects and advantages will become apparent as the description proceeds.

In the accompanying drawing, Figure 1 is a vertical axial sectional view of a rotary kiln embodying the features of our invention.

Figs. 2 to 6 are transverse sectional views taken respectively along lines 2—2 to 6—6 of Fig. 1.

While we have illustrated in the drawing and will herein describe in detail the prefered apparatus and process embodying our invention, it is to be understood that we do not thereby intend to limit the invention to the specific details disclosed, but intent to cover all modifications and alternative forms falling within the spirit and scope of the invention as expressed in the claims.

Referring more particularly to the drawing, the apparatus constituting the exemplary embodiment of the invention comprises an elongated rotary kiln 10 slightly inclined from the horizontal. The kiln has an outer cylindrical metal shell 11 closed at its upper and lower ends by metal end walls 12 and 13, these walls being lined internally with suitable refractory material 14. Preferably, the lower end portion of the kiln is concentrically enlarged as indicated at 15.

To support the kiln 10 for rotation, a plurality of annular tracks 16 are secured about the shell 11 at longitudinally spaced points, and rest on rollers 17 journaled in bearings 18 on fixed bases 19. An annular gear 20 is secured about the enlarged section of the shell 11, and meshes with a pinion 21 adapted to be connected through a shaft 22 and gears 23 to a suitable power drive (not shown).

Extending axially through the kiln 10 is an inner flue or tube 24 constructed of refractory material having a high thermal conductivity. The flue 24 is rotatable with the kiln 10, and defines therewith an annular chamber closed at the ends. Of the chamber, the upper portion constitutes a preheating zone 25, and the enlarged lower portion provides a reduction zone 26.

The flue 24 is supported in concentrically spaced relation to the shell 11 at intermediate spaced points along its length by a plurality of sets of radial legs 27. Preferably, these legs are tubular in form, and open from the interior of the flue 24 through the shell 11 to the atmosphere. Suitable dampers 28 are provided, one in the outer end of each tubular leg 27, for controlling the flow of air of combustion from the atmosphere into the flue 24. The upper end of the flue 24 extends outwardly through the end wall 12 of the kiln 10, and has an air-tight rotatable connection 29 with a stack 30.

The lower end portion of the flue 24, i. e. that portion within the enlarged section of the kiln 10, is formed with two concentric walls 31 and 32 defining an annular space 33 closed at its inner end. The inner wall 31 is closed at its lower end by an end wall 34 and the outer wall 32 extends through the lower end wall 13 of the kiln 10 for communication with a suitable source of air, preferably a source of air under a slight forced draft (not shown). The interior of the inner wall 31 and the exterior of the outer wall 32 are lined with protective radiant refractory material 35.

The annular air space 33 communicates through a plurality of longitudinally spaced sets of peripherally spaced openings 36 formed in the inner wall 31 with the interior of the lower end of the flue 24, and through similar openings 37 formed in the outer wall 32 with the reduction zone 26 in the enlarged section of the kiln 10. A plurality of longitudinally spaced sets of radial ducts 38 open from the reduction zone 26 through the walls 31 and 32, and the space 33 to the interior of the flue 24.

Means is provided for charging the material to be treated into the upper end of the kiln 10. In the present instance, this means comprises an elongated feed duct 39 extending through the lower portion of the stack 30 axially into the upper end of the heating flue 24. The inner end of the feed duct 39 is journaled in an axial sleeve 40 formed integral with and communicating with a plurality of hollow radial supporting legs 41 opening through the wall of the flue 24 to the upper end of the preheating zone 25. The outer end of the feed duct 39 communicates with the bottom of a hopper 42 in which the material to be treated is supplied. Rotatably mounted in the duct 39 is a conveyor screw 43 the outer end of which is adapted to be connected through gears 44 to a source of power (not shown).

To provide means for discharging the treated material from the kiln 10, the extreme lower end of the shell 11 is formed with a plurality of peripherally spaced discharge openings 45. Each opening 45 normally is closed by a gate or cover 46 which is mounted between spaced guide flanges 47 to slide peripherally, and which more specifically is adapted to be opened for discharge during a short period when in the lowest position of travel. The covers 46 may be adjusted in any desired manner to uncover or cover the openings 45, as for example automatically by means (not shown) operable as an incident to the rotation of the kiln.

The process is adapted for the low temperature reduction of various kinds of metal ores, and is particularly suited for the reduction of iron ore in the production of sponge iron, pig iron or steel. The comminuted ore is mixed with a suitable reducing agent in the desired proportion. Preferably, coal having a high percentage of volatile matter is employed.

In starting the operations of the kiln, reducing gases from an external source may be introduced into the upper end of the kiln 10. In the present instance, the gases are introduced through a pipe 48 controlled by a valve 49 into the duct 39 which may be especially enlarged to accommodate the gas stream. Reducing gases may also be introduced during the normal operation to supplement the gases evolved from the coal when coal is used. It will be evident that when such reducing gases are supplied, the carbonaceous material need not necessarily contain volatile matter within the broad conception of the invention. The charging of ore and fuel is continuous by the screw 43, however, the supply of coal to the screw may be provided by a large storage bin 50 which may be closed to prevent escape of gas when an auxiliary supply of gas is passed through duct 39.

The ore-fuel mixture is supplied to the hopper 42, from where it is fed continuously into the upper end of the annular preheating zone 25. Rotation of the kiln serves to feed the mixture downwardly and to effect a thorough agitation. In the course of its downward movement, the mixture is preheated in the zone 25, out of contact with air, by radiation from the flue 24. As the temperature rises, the volatile matter in the coal is distilled, and near the lower end of the zone 25 partial reduction of the ore may occur. The flow induced in the flue 24 by the natural draft of the stack 30 and the slight forced draft serves to maintain the interior of the kiln 10 at a relatively low pressure. Since the upper end of the kiln is closed, the products of distillation and reduction are caused to travel parallel with the charge downwardly to the reduction zone 26.

In the reduction zone 26, the ore and fuel mixture is heated to a high temperature by direct heat from partial combustion of the gases of distillation and reduction about the lower end of the flue 24. This combustion is supported by air supplied from the air space 33 through the openings 37. The reducing gases however about the region of combustion serve to protect the charge against oxidation.

The partially burned gases of distillation and reduction pass through the ducts 38 into the lower end of the flue 24 where further combustion occurs, the necessary air being supplied from the space 33 through the openings 36. Combustion about and within the double-walled portion of the flue 24 serves to heat the refractory lining 35 to a high temperature, and hence radiant heat also is supplied to the charge within the reduction zone 26.

The ore-fuel mixture thus is heated sufficiently to effect a thorough reduction of the ore to the metallic state. The reduced metal is automatically discharged from the extreme lower end of the kiln 10 through the openings 45, each being uncovered through rotation of the kiln for a brief period when in its lowermost position of travel.

The hot products of combustion and the unburned gases of distillation and reduction pass on upwardly through the flue 24. Secondary air is supplied through the supporting legs 27, and not only serves to cool the supports for the flue 24 but also to support final combustion of the unburned gases along the flue. Thus, the flue 24 is heated to a high temperature, and serves to provide radiant heat for the incoming ore-fuel mixture.

Since the gases in the flue 24 travel in a counter direction to the incoming charge, they are relatively cool when entering the stack 30.

It will be evident that we have provided an apparatus favorable to a high thermal efficiency because of the complete combustion of the volatile matter in the coal, and the recovery of the heat of combustion by the incoming charge. A relatively low grade coal, preferably coal that becomes plastic on sufficient heating and hence results in a porous mass and intimate contact with the ore, can be used. The final reduced product is not exposed to strongly oxidizing conditions as in the conventional direct fired, open end kiln. The amount of excess carbon that may be discharged with the product can therefore be kept down to a minimum.

We claim as our invention:—

1. An ore reducing furnace comprising, in combination, an elongated rotary kiln closed at both ends and slightly inclined from the horizontal, the lower end portion of said kiln being peripherally enlarged, a heating flue extending axially through said kiln for rotation therewith, the lower end of said flue being closed, the lower end portion of said flue being formed with spaced concentric walls defining an annular air inlet space, said walls being formed at spaced points with a plurality of openings establishing communication of said space respectively with the enlarged section of said kiln and the interior of said flue, a plurality of ducts connecting the interior of said enlarged section and said flue, means for supplying air to said flue at spaced points along its length, means for feeding a mixture of ore and carbon into the upper end of said kiln, and means for discharging the material after treatment from the lower end of said kiln.

2. An ore reducing furnace comprising, in combination, an elongated rotary kiln closed at both ends, a heating flue extending longitudinally through said kiln, one end of said flue being closed and being formed with a peripheral air inlet space, said flue being formed with openings establishing communication of said space respectively with the interior of said kiln and the interior of said flue, a plurality of ducts connecting the interior of said kiln with said flue, means for feeding a mixture of ore and carbon into one end of said kiln, and means for discharging the material after treatment from the other end of said kiln.

3. An ore reducing furnace comprising, in combination, an elongated rotary kiln closed at both ends and slightly inclined from the horizontal, the lower end portion of said kiln being peripherally enlarged, a central flue extending axially through said kiln, means for supplying air to the lower end of said flue, means establishing communication between the interior of said kiln and the lower end of said flue, means for feeding a mixture of ore and carbon into the upper end of said kiln, and means for discharging the material after treatment from the lower end of said kiln.

4. An ore reducing furnace comprising, in combination, a rotary kiln closed at both ends, a central flue extending axially through said kiln, means for supplying air to one end of said kiln closely about said flue, means establishing communication between said one end of said kiln and the adjacent end of said flue, means for feeding a mixture of ore and carbon into said kiln, and means for discarginhg the material after treatment from said kiln.

5. An ore reducing furnace comprising, in combination, an elongated rotary kiln closed at both ends, one end of said kiln constituting a combustion chamber, a central heating flue extending axially through said kiln, one end portion of said flue opening to said combustion chamber, radiant refractory material secured about said one end portion of said flue, means for feeding a mixture of ore and carbon into said kiln, and means for discharging the material after treatment from said kiln.

6. An ore reducing furnace comprising, in combination, an elongated rotary kiln closed at both ends and slightly inclined from the horizontal, a flue extending longitudinally through said kiln and secured thereto for rotation therewith, said flue having walls of high thermal conductivity, the lower end of said flue communicating with the lower end of said kiln, means for supplying air to the lower end of said flue, supplemental means for supplying secondary air for combustion directly to said flue intermediate its ends, means for feeding a mixture of ore and carbon into the upper end of said kiln, and means for discharging the material after treatment from the lower end of said kiln.

7. An ore reducing furnace comprising, in combination, a rotary kiln closed at both ends, a central heating flue extending axially through said kiln, a plurality of hollow radial supporting legs supporting said flue within said kiln and establishing communication between said flue and the atmosphere, and means for feeding a mixture of ore and carbon into said kiln.

8. An ore reducing furnace comprising, in combination, a rotary kiln closed at both ends, a heating flue extending longitudinally through said kiln, a plurality of air ducts extending laterally through said kiln to said flue, cne end of said flue communicating with the interior of said kiln, and means for feeding a mixture of ore and carbon into said kiln.

9. An ore reducing furnace comprising, in combination, an elongated rotary kiln, a central axial heating flue extending through one end of said kiln, a plurality of hollow radial converging legs formed with and communicating with a central axial sleeve, and secured in said flue and opening therethrough into said kiln, a feed duct extending at one end into said sleeve for relative rotation, and means for supplying a mixture of ore and carbon through said feed duct to said legs.

10. An ore reducing furnace comprising, in combination, an elongated rotary kiln closed at both ends, a heating flue extending longitudinally through said kiln for rotation therewith, one end portion of said flue being formed with spaced concentric walls defining an annular air inlet space, said walls being formed at spaced points with a plurality of openings establishing communication of said space respectively with said kiln and the interior of said flue, a plurality of ducts directly connecting the interior of said kiln and said flue, means for supplying air to said space, means for feeding a mixture of ore and carbon into one end of said kiln, and means for discharging the material after treatment from the other end of said kiln.

OLAF A. HOUGEN.
KENNETH M. WATSON.